(12) United States Patent
Terry et al.

(10) Patent No.: US 9,540,267 B2
(45) Date of Patent: *Jan. 10, 2017

(54) CHEMICAL RELEASE SYSTEM

(71) Applicant: Nuvo Residential, LLC, Kaysville, UT (US)

(72) Inventors: David Terry, Gilbert, AZ (US); Sean Terry, Gilbert, AZ (US); Byron Laird Washburn, Fruit Heights, UT (US)

(73) Assignee: Nuvo Residential, LLC, Kaysville, UT (US)

( * ) Notice: Subject to any disclaimer, the term of this patent is extended or adjusted under 35 U.S.C. 154(b) by 154 days.

This patent is subject to a terminal disclaimer.

(21) Appl. No.: 14/230,610

(22) Filed: Mar. 31, 2014

(65) Prior Publication Data

US 2014/0209641 A1 Jul. 31, 2014

Related U.S. Application Data

(63) Continuation of application No. 13/846,271, filed on Mar. 18, 2013, now Pat. No. 8,685,335, which is a continuation of application No. 12/635,506, filed on Dec. 10, 2009, now Pat. No. 8,440,075.

(60) Provisional application No. 61/121,292, filed on Dec. 10, 2008.

(51) Int. Cl.
*B01F 1/00* (2006.01)
*B01F 5/04* (2006.01)
*C02F 1/68* (2006.01)
*C02F 5/08* (2006.01)
*C02F 5/10* (2006.01)

(52) U.S. Cl.
CPC ............... *C02F 5/08* (2013.01); *B01F 1/0033* (2013.01); *B01F 5/0496* (2013.01); *C02F 1/688* (2013.01); *C02F 5/086* (2013.01); *C02F 5/10* (2013.01); *C02F 2201/006* (2013.01); *Y10T 137/4891* (2015.04)

(58) Field of Classification Search
CPC .............. C02F 5/08; C02F 5/086; C02F 5/10; C02F 1/688; C02F 2201/006; B01F 5/0496; B01F 1/0033
See application file for complete search history.

(56) References Cited

U.S. PATENT DOCUMENTS

| | | | |
|---|---|---|---|
| 1,691,359 | A | 11/1928 | Pulkinghorn |
| 3,195,558 | A | 7/1965 | Klueber et al. |
| 3,289,847 | A | 12/1966 | Rothemund |
| 3,901,262 | A | 8/1975 | Gutkowski |
| 4,347,224 | A | 8/1982 | Beckert et al. |

(Continued)

*Primary Examiner* — Lucas Stelling
(74) *Attorney, Agent, or Firm* — Brinks Gilson & Lione; Ryan L. Marshall

(57) ABSTRACT

A chemical release system. Implementations may utilize implementations of a first cartridge that include a body coupled with a cartridge head at a first end and coupled with an end plug at a second end where the cartridge head includes a through hole configured to engage with an annular flange in a main head. The body may have an internal cross section. The first cartridge may also include a flow restrictor plate disposed within the body between the first end and the second end where the flow restrictor plate is oriented substantially parallel to the cartridge head within the body, includes only one opening therethrough, and substantially conforms with the internal cross section of the body. The body may include one or more through holes in a side of the body located between the flow restrictor plate and the cartridge head.

12 Claims, 4 Drawing Sheets

(56) References Cited

U.S. PATENT DOCUMENTS

| | | | |
|---|---|---|---|
| 4,548,227 | A | 10/1985 | Regunathan et al. |
| 4,691,732 | A | 9/1987 | Johnson et al. |
| 5,507,945 | A | 4/1996 | Hansen |
| 5,580,448 | A | 12/1996 | Brandreth, III |
| 5,730,178 | A | 3/1998 | Zhadanov et al. |
| 5,913,327 | A | 6/1999 | Zhadanov et al. |
| 6,241,884 | B1 | 6/2001 | Hansen |
| 6,325,926 | B1 | 12/2001 | Hansen |
| 6,656,353 | B2 | 12/2003 | Kilawee et al. |
| 6,722,583 | B2 | 4/2004 | Restaino, Jr. et al. |
| 6,773,588 | B2 | 8/2004 | Beeman et al. |
| 7,297,257 | B1 | 11/2007 | Terry |
| 8,440,075 | B2 | 5/2013 | Terry et al. |
| 8,685,335 | B2 | 4/2014 | Terry et al. |
| 2008/0152556 | A1 | 6/2008 | Brandreth |

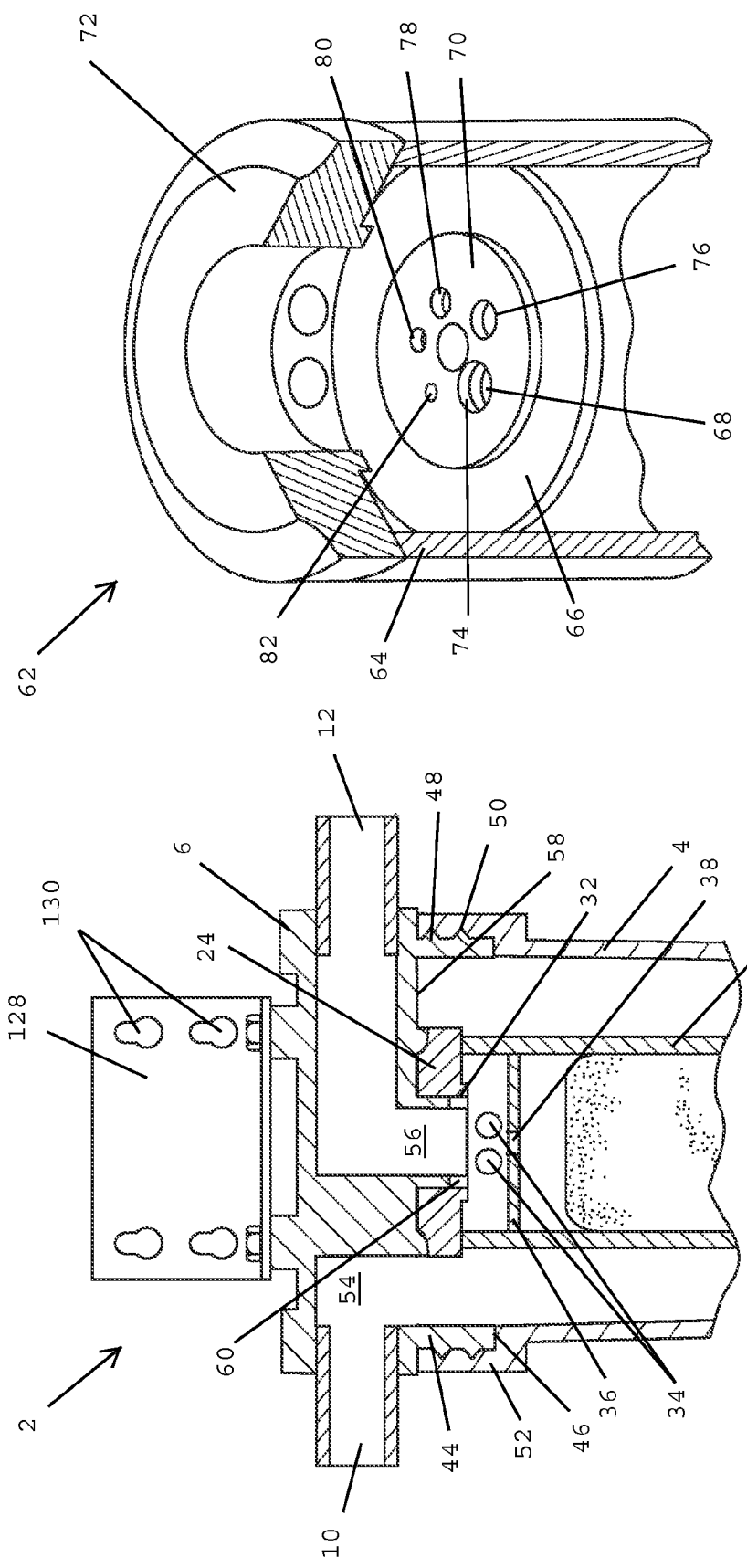

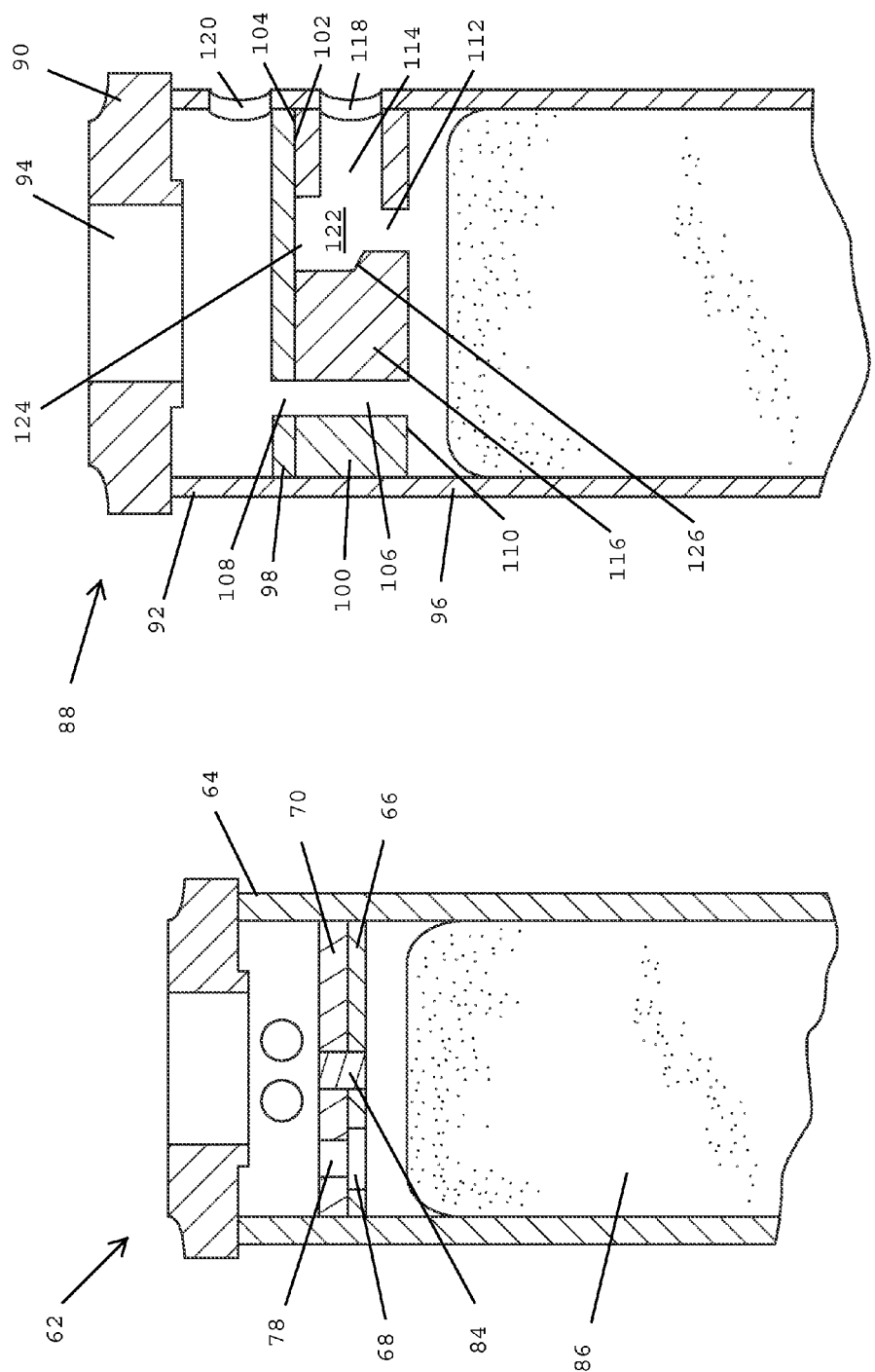

CHEMICAL RELEASE SYSTEM

CROSS REFERENCE TO RELATED APPLICATIONS

This application is a continuation of U.S. application Ser. No. 13/846,271, filed Mar. 18, 2013 which issued on Apr. 1, 2014, as U.S. Pat. No. 8,685,335, which is a continuation of U.S. application Ser. No. 12/635,506, filed Dec. 10, 2009, which issued on May 14, 2013 as U.S. Pat. No. 8,440,075, all of which claim benefit of the filing date of U.S. Provisional Patent Application 61/121,292, entitled "Mechanical Release System" to Terry et al., which was filed on Dec. 10, 2008, the disclosures of which are hereby incorporated entirely herein by reference.

BACKGROUND

1. Technical Field

Aspects of this document relate generally to systems used for transfer of one or more chemical components into a liquid.

2. Background Art

A wide variety of conventional systems and assemblies have been devised to transfer a chemical component into a liquid. The reason for the transfer may be to start a reaction, allow for separation of a desired component in the liquid from the liquid, or to control a characteristic of the liquid. In water purification systems, filter systems have been devised that capture solid particles and foreign material present in the water as it flows through the filters. Other water processing systems operate by purifying the water through distillation processes, leaving impurities behind, or by treating the water with ultraviolet light to kill bacteria and other organisms present in the water. The taste of water has also been controlled by the use of activated carbon filters that serve to capture chemicals in the water that cause disagreeable odors and/or tastes. Each of these systems seeks to control a characteristic of the water.

SUMMARY

Implementations of chemical release systems may utilize implementations of a first cartridge that include a body coupled with a cartridge head at a first end and coupled with an end plug at a second end where the cartridge head includes a through hole configured to engage with an annular flange in a main head. The body may have an internal cross section. The first cartridge may also include a flow restrictor plate disposed within the body between the first end and the second end where the flow restrictor plate is oriented substantially parallel to the cartridge head within the body, includes only one opening therethrough, and substantially conforms with the internal cross section of the body. The body may include one or more through holes in a side of the body located between the flow restrictor plate and the cartridge head.

Implementations of a first cartridge may include one, all, or any of the following:

The first cartridge may include a quantity of scale-reducing chemical disposed within the body between the flow restrictor plate and the end plug.

A diameter of the only one opening of the flow restrictor plate may be smaller than a diameter of the one or more through holes in the side of the body.

Implementations of chemical release systems may utilize implementations of a second cartridge that include a body coupled with a cartridge head at a first end and coupled with an end plug at a second end where the cartridge head includes a through hole configured to engage with an annular flange in a main head and where the body forms a substantially annularly cylindrical housing having an internal cross section. The second cartridge may include a flow restrictor plate disposed within the body between the first end and the second end where the flow restrictor plate is oriented substantially parallel to the cartridge head within the body, includes only one opening therethrough, and substantially conforms with the internal cross section of the body. An internal flow body may be included coupled to the flow restrictor plate at a first side of the internal flow body and at a side of the flow restrictor plate that faces the second end. The internal flow body may substantially conform with the internal cross section of the body and may include a first opening therein extending from the first side of the internal flow body through a second side of the internal flow body where the first opening is aligned with the only one opening of the flow restrictor plate. A second opening may be included therein that extends inwardly from the second side of the internal flow body and joins with a third opening in a thickness of the internal flow body. The third opening may be aligned substantially perpendicularly with the second opening and may be aligned with a first through hole in a side of the body. The body may include one or more second through holes in a side of the body located between the flow restrictor plate and the cartridge head.

Implementations of a second cartridge may include one, all, or any of the following:

The cartridge may include a quantity of scale-reducing chemical disposed within the body between the internal flow body and the end plug.

The internal flow body may further include a recirculation zone at a location within the internal flow body where the second opening and third opening join.

The recirculation zone may be formed by a fourth opening in the internal flow body extending from the first side inwardly that has a diameter greater than the second opening and which is aligned with the second opening.

The recirculation zone may include at least one taper at the location where the second opening and the third opening join.

A diameter of the first opening may be smaller than a diameter of the second opening.

A diameter of the first through hole and a diameter of the one or more second through holes in the side of the body may be the same.

Implementations of a chemical release system may include a pressure vessel including a unitary housing defining an internal cavity and an opening at a first end including a shoulder. A main head may also be include and coupled to the pressure vessel at the shoulder with a first annular flange. The main head may include an inlet opening therein and an outlet opening therein where the inlet opening extends from an inlet into the main head and out a first side of the main head facing the internal cavity of the unitary housing. The outlet opening may extend inwardly from the first side of the main head and out an outlet of the main head where the outlet opening is encircled by a second annular flange extending from the first side of the main head. A cartridge may be included that is coupled with the main head at the second annular flange. The cartridge may include a body coupled with a cartridge head at a first end and coupled with an end plug at a second end where the cartridge head includes a through hole configured to engage with the second annular flange. The body may form a substantially annularly cylindrical housing having an internal cross section. A flow restrictor plate may be disposed within the body between the first end and the second end wherein the flow restrictor plate is oriented substantially parallel to the cartridge head within the body, includes only one opening therethrough, and substantially conforms with the internal cross section of the body. An internal flow body may be coupled with the flow restrictor plate at a first side of the internal flow body and may substantially conform with the internal cross section of the body. The internal flow body may include a first opening therein extending from the first side of the internal flow body through a second side of the internal flow body where the first opening is aligned with the only one opening of the flow restrictor plate. A second opening may be included therein that extends inwardly from the second side of the internal flow body and joins with a third opening in a thickness of the internal flow body. The third opening may be aligned substantially perpendicularly to the second opening and may be aligned with a first through hole in a side of the body. The body may include one or more second through holes in side of the body located between the flow restrictor plate and the cartridge head.

Implementations of chemical release systems like those disclosed in this document may include one, all, or any of the following:

The cartridge may further include a quantity of scale-reducing chemical disposed within the body between the internal flow body and the end plug.

The internal flow body may further include a recirculation zone at a location within the internal flow body where the second opening and third opening join.

The recirculation zone may be formed by a fourth opening in the internal flow body extending from the first side inwardly having a diameter greater than the second opening and aligned with the second opening.

The recirculation zone may include at least one taper at the location where the second opening and third opening join.

A diameter of the first opening may be smaller than a diameter of the second opening.

A diameter of the first through hole and a diameter of the one or more second through holes in the side of the body may be the same.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 5 is a detail cross section view of the main head of the implementation of a chemical release system illustrated in FIG. 1;

FIG. 6A is a detail sectional view of a first end of an implementation of a second cartridge showing the internal structure of the first end;

FIG. 6B is a detail cross section view of the first end of the second cartridge implementation illustrated in FIG. 6A;

FIG. 7 is a detail cross section view of the first end of an implementation of a third cartridge.

DESCRIPTION

This disclosure, its aspects and implementations, are not limited to the specific components or assembly procedures disclosed herein. Many additional components and assembly procedures known in the art consistent with the intended chemical release system and/or assembly procedures for a chemical release system will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such chemical release systems and implementing components, consistent with the intended operation.

Figure 1:
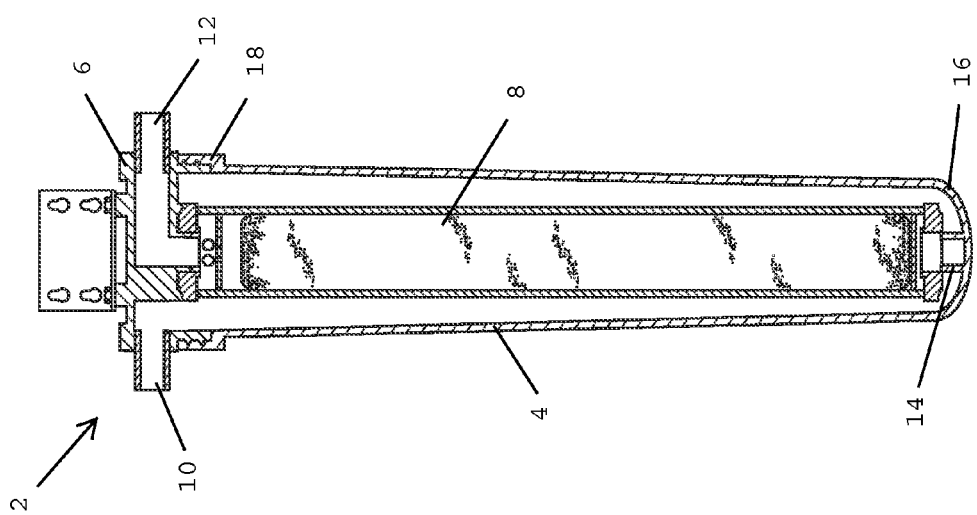
FIG. 1 is a cross section view of an implementation of a chemical release system taken through the center of an inlet and outlet of the main head.

Structure:

Referring to FIG. 1, a cross section view of an implementation of a chemical release system 2 is illustrated. As illustrated, the system 2 includes a pressure vessel 4 coupled to a main head 6 at a first end 18 to which a cartridge (first cartridge) 8 has been coupled. The main head 6 includes an inlet 10 and an outlet 12 that are configured to be coupled inline with a cold water line (or other line carrying another type of liquid) through the use of any of a wide variety of fittings and/or connections, such as push-connect fittings, compression fittings, welds, or any other method of coupling pipe. The cartridge 8 in particular implementations may couple to the pressure vessel 4 through a projection 14 that extends from a second end 16 of the pressure vessel 4.

Figure 2:
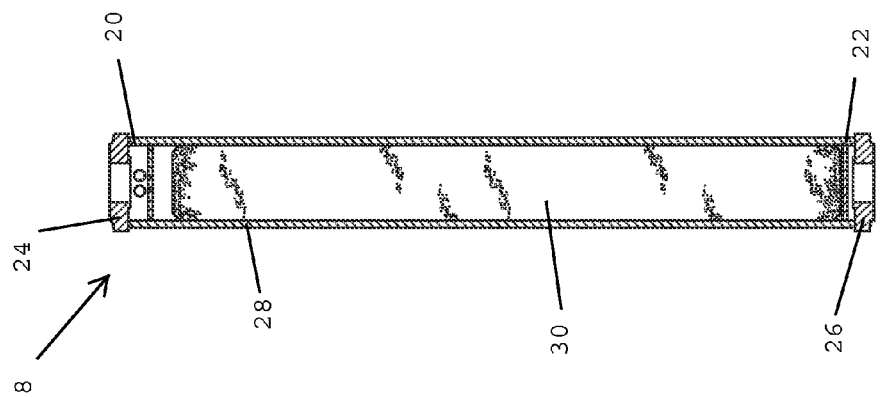
FIG. 2 is a cross section view of an implementation of a first cartridge taken through the center of the cartridge.

Referring to FIG. 2, an implementation of a cartridge 8 like the one illustrated in FIG. 1 is shown. As illustrated, the body 28 of the cartridge 8 has a first end 20 and a second end 22 with a cartridge head 24 coupled at the first end 20 and an end plug 26 coupled at the second end 22. The body 28 of the cartridge 8 may, in particular implementations, form an annularly cylindrical housing, though the body 28 may form any shaped housing depending upon the shape of the cross section of the body, such as, by non-limiting example, square, oval, elliptical, rectangular, octagonal, and any other closed shape. A chemical 30 is disposed within a portion of the body 28. Any of a wide variety of chemicals 30 may be included in various implementations of chemical release systems, depending upon the desired function of the system. For example, if the fluid flowing through the chemical release system were water, the chemical may be a proprietary blend of biodegradable citric acid ($H_3C_6H_5O_7$) and polyphosphate ($PO_4$) or other phosphates marketed under the tradename Citryne® designed to prevent the build up of scale caused by calcium carbonate and other ions in hard water on equipment and piping. In these implementations, the blend may be included in the form of a powder dispersed within the body 28 or within a water permeable bag that holds the Citryne® powder. An example of such a bag is found in U.S. Pat. No. 7,297,257 to LeRoy Terry entitled "Chemical Release System," issued Nov. 20, 2007,the disclosure of which is hereby incorporated herein entirely by reference. If the fluid flowing through the chemical release system were oil, the chemical 30 may be a reactive material that may be premixed with the oil before it enters a reactor. Those of ordinary skill in the art will readily be able to selected chemicals and a proper way of placing the chemical within the body 28 in order to create the desired effect of a particular chemical release system implementation.

Figure 3:
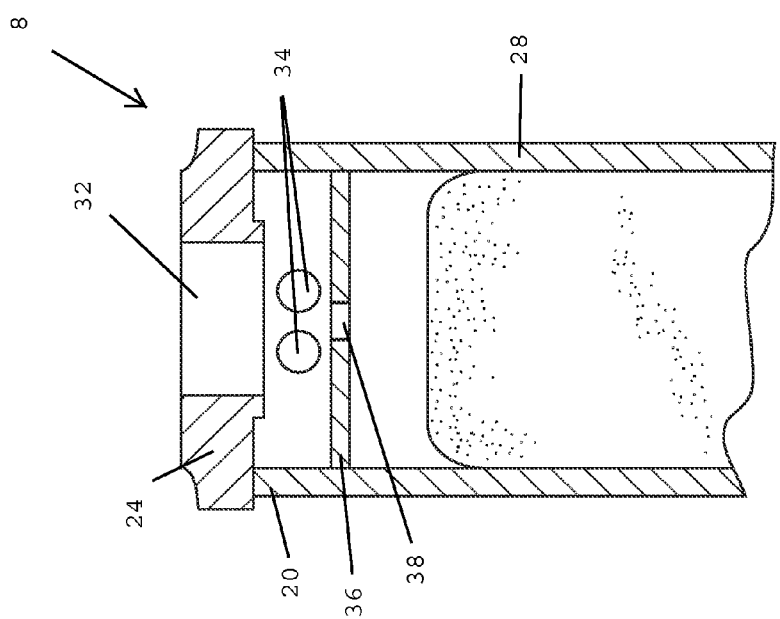
FIG. 3 is a detail cross section view of a first end of the first cartridge implementation illustrated in FIG. 2.

Referring to FIG. 3, a detail view of the first end 20 of the cartridge 8 of FIG. 2 is illustrated. As illustrated, the cartridge head 24 includes a through hole 32 that is configured to engage with an annular flange in the main head 6. The body 28 also includes two through holes 34 in a side of the body 28, though a single through hole or more than two through holes may be utilized in particular implementations. The through holes 34 are located between the cartridge head 24 and a flow restrictor plate 36 disposed between the first end 20 and the second end 22 of the cartridge 8 which has substantially the same cross section as the body 28. As illustrated, the flow restrictor plate 36 is oriented substantially parallel to the cartridge head 24. A single opening 38 extends through the flow restrictor plate 36. Since there are no other openings in the body between the through holes 34 and the portion of the interior of the body 28 on the side of the flow restrictor plate 36 that faces the end cap 26, the only way for fluid to enter and leave the portion is through the single opening 38.

Figure 4:
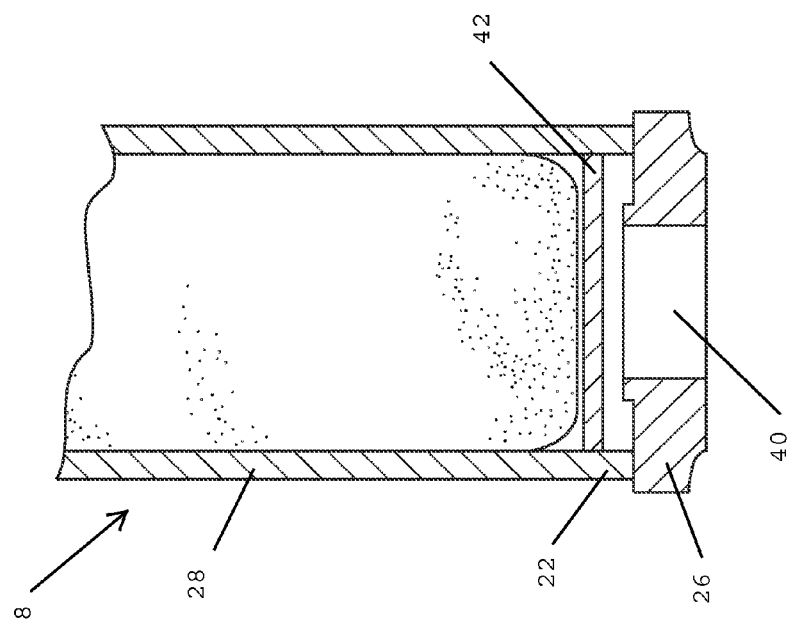
FIG. 4 is a detail cross section view of the second end of the first cartridge implementation illustrated in FIG. 2.

Referring to FIG. 4, the structure of the second end 22 of the cartridge 8 is illustrated showing the end cap 26 that, in particular implementations, includes a through hole 40 therethrough sized to correspond with the projection 14 that extends from the second end 16 of the pressure vessel 4. In implementations where the end cap 26 includes a through hole 40, a plug plate 42 may be enclosed that completely seals the second end 22 of the body 28 thereby preventing fluid from entering.

Referring to FIG. 5, a cross section of the main head 6 illustrated in FIG. 1 is shown with the pressure vessel 4 and cartridge 8 coupled in their respective positions. As illustrated, the main head 6 includes a first annular flange 44 that engages with a shoulder 46 included in the pressure vessel 4. As illustrated, the first annular flange 44 may include screw threads 48 that engage in corresponding screw threads 50 in an annular flange 52 extending from the shoulder 46 of the pressure vessel 4. Other implementations may have the pressure vessel 4 and main head 6 coupled through any of a wide variety of other structures and or systems, such as, by non-limiting example, gluing, welding, compression fittings, or any other method of coupling two pipes together. As illustrated, the main head 6 includes an inlet opening 54 in fluid connection with the inlet 10 and an outlet opening 56 in fluid connection with the outlet 12. As illustrated, the inlet opening 54 extends out a first side 58 of the main head 6. The first side 58 is the side of the main head 6 that faces into the internal cavity formed by the pressure vessel 4. The outlet opening 56 is encircled by a second annular flange 60 that extends away from the first side 58 of the main head 6. The second annular flange 60 engages in the through hole 32 of the cartridge head 24. Additional flanges and gaskets may be included on the first side 58 of the main head 6 to aid in seating and securing the cartridge 8 against the main head 6 in various implementations.

Referring to FIG. 6A, a sectional view of a first end 64 of an implementation of a second cartridge 62 is illustrated. As illustrated, the second cartridge 62 also includes a flow restrictor plate 66 with a single opening 68 in the plate, but also has an orifice selector 70 coupled with the flow restrictor plate 66 on the surface facing the cartridge head 72. The orifice selector 70 includes a plurality of orifices 74, 76, 78, 80, and 82 that have different diameters and are configured to align with the single opening 68 in the flow restrictor plate 66 as the orifice selector 70 is rotated about the point at which it is coupled to the flow restrictor plate 66. As illustrated, one of the orifices 74 may be the same size as the single opening 68, or they may be larger or smaller as desired.

Referring to FIG. 6B, a cross section view of the first end 64 of the implementation of the second cartridge 62 illustrated in FIG. 6A is shown. As illustrated, the orifice selector 70 is coupled to the flow restrictor plate 66 through a pivot 84 that extends into both the orifice selector 70 and the flow restrictor plate 66. One of the orifices 78 is shown aligned with the single opening 68 in the flow restrictor plate 66 indicating that the amount of fluid flow (and the effect/amount of the chemical within the cartridge 62 passing into the fluid) can be controlled or selected by the user through rotation of the orifice selector 70. In particular implementations, the orifice selector 70 may also allow for the isolation of the chemical 86 in the cartridge 62 from the fluid if the user rotates the orifice selector 70 to a portion of the orifice selector 70 that does not contain a through hole over the single opening 68. This may allow the user to perform startup and other tasks without expending the chemical 86 contained in the cartridge 62 or having to be concerned with effects caused by the chemical 86 while troubleshooting or repairing system problems.

Referring to FIG. 7, an implementation of a third cartridge 88 for a chemical release system implementation is illustrated. As illustrated, the third cartridge 88 includes a cartridge head 90 coupled at a first end 92 of the cartridge 88 with a through hole 94 therethrough configured to engage with a first annular flange 44 of the main head 6 (similar to the other implementations disclosed in this document). The cartridge 88 also includes a body 96 that may, in particular implementations, form a substantially annularly cylindrical housing, though any of the other shapes for the body 96 disclosed in this document may be utilized in various implementations. The body 96 also has an internal cross section formed by the perimeter of the interior edge of the body 96. A flow restrictor plate 98 is also included and is located within the body 96 between the first end 92 and a second end 96 of the body (not shown in this detail view). As in previous implementations, the flow restrictor plate 98 is oriented substantially parallel to the cartridge head 90 and substantially conforms with the internal cross section of the body 96 and contains only one opening 108 therethrough. An internal flow body 100 is coupled to the flow restrictor plate 98 at a first side 102 of the internal flow body 100 and at the side 104 of the flow restrictor plate 98 that faces the second end of the cartridge 88. The internal flow body also substantially conforms with the internal cross section of the body 96.

The internal flow body 100 includes a first opening 106 that extends from the first side 102 of the internal flow body 100 through to a second side 110 of the internal flow body 100 and aligns with the only one opening 108 in the flow restrictor plate 98. A second opening 112 also opens into the internal flow body 100 from the second side 110 and joins with a third opening 114 in a thickness 116 (width) of the internal flow body 110. The third opening 114 is aligned substantially perpendicularly with the second opening (though it could be aligned substantially at an angle from perpendicular in various implementations) and also aligns with a first through hole 118 in a side of the body 96. The body 96 also includes one or more second through holes 120 in a side of the body located between the flow restrictor plate 98 and the cartridge head 90. At the location within the internal flow body 110 where the third opening 114 and the second opening 112 join, a recirculation zone 122 may be included in particular implementations. The recirculation zone 122 may be formed from the intersection of a fourth opening 124 that extends inwardly from the first side 102 that has a diameter larger than the second opening 112 and is aligned with the second opening 112. In various implementations, the recirculation zone 122 may include at least one taper 126 at the location where the second opening 112 and the third opening 114 join. In various implementations, the diameter of the first opening 106 may be smaller than a diameter of the second opening 112, though the diameters may be the same or the diameter of the second opening 112 may be smaller in particular implementations.

While the flow restrictor plate 98 and the internal flow body 100 are illustrated in the implementations shown in FIG. 7 as being nominally two separate pieces, in particular implementations they may be integrally formed, and the distinctions regarding sides of the individual components will no longer apply. In implementations where the flow restrictor plate 98 and the internal flow body 100 are formed as separate pieces, they may be secured with in the body 96 and to each other by gluing, welding, or any other fastening technique.

For the exemplary purposes of this disclosure, the measurements of an implementation of a third cartridge 88 like those disclosed in this document are included. The diameter of the body 96 may be 2⅛ inches, and the diameter of the through hole 94 in the cartridge head 90 may be 1 1/16 inches. The length of the body 96 from the first end 92 to the second end may be 19 1/16 inches. The thickness of the flow restrictor plate 98 may be ⅛ of an inch and the diameter of the flow restrictor plate 98 may be 2 inches. The thickness 116 of the internal flow body 100 may be ⅝ of an inch and the diameter of the internal flow body 100 may be 2 inches. The distance from the edge of the cartridge head 90 that faces the second end to the edge of the flow restrictor plate 98 that faces the cartridge head 90 may be ¾ of an inch. The only one opening 108 in the flow restrictor plate 98 and the first opening 106 in the internal flow body 100 may both have diameters of 3/16 of an inch. The diameter of the second opening 112, third opening 114, and fourth opening 124 in the internal flow body 100 may be ¼ inch, ⅜ inch, and ½ inch, respectively. The diameter of the first through hole 118 in the side of the body 96 and the diameter of the one or more second through holes 120 in a side of the body 96 may be equal and be ⅜ of an inch. In particular implementations, however, the diameters of the first through hole 118 and of the one or more second through holes 120 may be different. The chemical included in the cartridge 88 may be that marketed under the tradename Citryne® and may be enclosed in a permeable bag.

Use.

Referring to FIG. 5, implementations of first cartridges 8 may operate in conjunction with a main head 6 and pressure vessel 4 as follows when water is used as the working fluid: Water from inlet 10 flows down inlet opening 54 to fill the internal cavity of the pressure vessel 4. Water from the internal cavity then flows through the through holes 34 into the space between the canister head 24 and the flow restrictor plate 36 and passes through the single opening 38 in the flow restrictor plate 36. Because there are no other openings in the cartridge 8 that can allow water from the inlet opening 54 to enter the cartridge 8, all of the water that flows through chemical release system 2 enters the through holes 34 on its way to the outlet 12. The water that passes through the single opening 38 in the flow restrictor plate 36 encounters the chemical in the cartridge and some of the chemical dissolves in the water. Without being bound by any theory, it is believed that movement of the dissolved chemical into the water above the flow restrictor plate 36 in implementations of a first cartridge 8 is driven primarily by diffusion of the dissolved chemical through the water in the single opening 38 in the flow restrictor plate 36. Dissolved chemical that has passed through the single opening 38 in the flow restrictor plate 36 is mixed with water passing through the through holes 34, enters the outlet opening 56, and moves out the outlet 12. Implementations of second cartridges 62 also operate in a similar way with the water and dissolved chemical passing through the particular orifice and single opening on its way out to the outlet.

Referring to FIG. 7, implementations of third cartridges 88 operate similarly to the first cartridges 8 and second cartridges 62 except that after the water fills the internal cavity of the pressure vessel 4, water enters through the first through hole 118, the one or more second through holes 120, through the only one opening 108 in the flow restrictor plate 98, and the first opening 106 in the internal flow body 100. Without being bound by any theory, it is believed that the flow regime within third cartridge implementations 88 is as follows: Water enters the first through hole 118 and passes through the third opening 114 in the internal flow body 100, encountering the recirculation zone 122, in implementations that have such a zone. In such implementations, it is believed that the water circulates in the space created by the fourth opening 124 in the internal flow body 100 and then passes through the second opening 112 in the internal flow body 100 into the space between the internal flow body 100 and the chemical within the cartridge 88. Chemical dissolves in the water and is carried along with the water through the first opening 106 in the internal flow body 100 and through the only one opening 108 in the flow restrictor plate 98 where it mixes with water that has passed through the one or more second through holes 120. The mixed water then passes out the through hole 94 in the cartridge head 90 and moves to the outlet opening 56 to the outlet 12.

Implementations of chemical release systems 2 may be installed in either free standing or wall or flat support configurations. Referring to FIG. 5, in wall or flat support configurations, a bracket 128 may be used with a plurality of fastener holes 130 therethrough for fastening the chemical release system 2 to the wall or flat support. Any of a wide variety of configurations are possible using the principles disclosed in this document.

In places where the description above refers to particular implementations of chemical release systems, it should be readily apparent that a number of modifications may be made without departing from the spirit thereof and that these implementations may be applied to other chemical release system implementations

The invention claimed is:
1. A cartridge for a chemical release system, comprising:
   a body having a first end, a second end, a first opening defining a passageway between an exterior of the body and an interior of the body located between the first and second end, a second opening defining a passageway between the exterior of the body and the interior of the body located between the first opening and the second end, and a third opening defining a passageway between an exterior of the body and an interior of the body located at the first end;
   an internal flow body having a perimeter conforming to an internal cross section of the body and having a first side adjacent the first opening and a second side opposite the first side, the internal flow body disposed with the first side of the internal flow body facing the first end, and the second side facing the second end, the internal flow body comprising:
   a first flow opening extending from the first side of the internal flow body to the second side of the internal flow body, and
   a second flow opening extending from the second side of the internal flow body to the perimeter of the flow body, the second flow opening aligned with the second opening.

2. The cartridge of claim 1, wherein the internal flow body further comprises a restrictor plate having a first plate side facing the first end and a second plate side opposite the first plate side and adjacent the first side of the internal flow body, the restrictor plate having a single through hole from the first plate side to the second plate side aligned with the first flow opening.

3. The cartridge of claim 1, wherein the second flow opening has a first portion perpendicular to the second side of the flow body and a second portion perpendicular to the first portion and aligning with the second opening.

4. The cartridge of claim 1, further comprising a scale-reducing chemical disposed within the body between the internal flow body and the second end.

5. The cartridge of claim 1, wherein a diameter of the first flow opening is smaller than a diameter of the second flow opening.

6. The cartridge of claim 1, wherein a diameter of the first opening is the same as a diameter of the second opening.

7. A chemical release system, comprising:
   a pressure vessel comprising a unitary housing defining an internal cavity and an opening at a first end, the opening having a shoulder;
   a main head having an annular flange coupled to the pressure vessel at the shoulder, the main head comprising an inlet opening and an outlet opening, the inlet opening extending from an inlet into the main head and out a first side of the main head facing the internal cavity of the unitary housing and the outlet opening extending inwardly from the first side of the main head and out an outlet of the main head, the outlet opening encircled by a second annular flange extending from the first side of the main head; and
   a cartridge coupled with the main head at the second annular flange, the cartridge comprising:
     a body having a first end, a second end, a first opening defining a passageway between an exterior of the body and an interior of the body located between the first and second end, a second opening defining a passageway between the exterior of the body and the interior of the body located between the first opening and the second end, and a third opening defining a passageway between an exterior of the body and an interior of the body located at the first end;
     an internal flow body having a perimeter conforming to an internal cross section of the body and having a first side adjacent the first opening and a second side opposite the first side, the internal flow body disposed with the first side of the internal flow body facing the first end, and the second side facing the second end, the internal flow body comprising:
       a first flow opening extending from the first side of the internal flow body to the second side of the internal flow body, and
       a second flow opening extending from the second side of the internal flow body to the perimeter of the flow body, the second flow opening aligned with the second opening.

8. The chemical release system of claim 7, wherein the cartridge further comprises a quantity of scale-reducing chemical disposed within the body between the internal flow body and the second end.

9. The chemical release system of claim 7, wherein a diameter of the first flow opening is smaller than a diameter of the second flow opening.

10. The chemical release system of claim 7, wherein a diameter of the first opening and a diameter of the second opening are the same.

11. The chemical release system of claim 7, wherein the internal flow body further comprises a restrictor plate having a first plate side facing the first end and a second plate side opposite the first plate side and adjacent the first side of the internal flow body, the restrictor plate having a single through hole from the first plate side to the second plate side aligned with the first flow opening.

12. The cartridge of claim 7, wherein the second flow opening has a first portion perpendicular to the second side of the flow body and a second portion perpendicular to the first portion and aligning with the second opening.

* * * * *